(12) United States Patent
Motozawa et al.

(10) Patent No.: US 7,200,474 B2
(45) Date of Patent: Apr. 3, 2007

(54) VEHICLE OCCUPANT PROTECTION APPARATUS

(75) Inventors: Yasuki Motozawa, Wako (JP); Koki Sato, Wako (JP); Ryozo Yoshizawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 141 days.

(21) Appl. No.: 11/012,532

(22) Filed: Dec. 15, 2004

(65) Prior Publication Data

US 2005/0131606 A1 Jun. 16, 2005

(30) Foreign Application Priority Data

Dec. 16, 2003 (JP) ............................. 2003-418622

(51) Int. Cl.
*B60N 2/22* (2006.01)
*B60N 2/42* (2006.01)

(52) U.S. Cl. ........................... 701/45; 701/49; 180/271
(58) Field of Classification Search ..................... None
See application file for complete search history.

(56) References Cited

U.S. PATENT DOCUMENTS

| | | | | |
|---|---|---|---|---|
| 6,034,458 A * | 3/2000 | Uetake et al. | ......... | 310/156.49 |
| 6,109,690 A * | 8/2000 | Wu et al. | ............... | 297/216.13 |
| 6,296,306 B1 * | 10/2001 | Specht et al. | ........... | 297/216.14 |
| 6,331,034 B1 * | 12/2001 | Specht | ................... | 297/362.11 |
| 6,427,935 B1 * | 8/2002 | Fujii et al. | ................ | 242/390.9 |
| 7,091,685 B2 * | 8/2006 | Makaran | ...................... | 318/434 |
| 2001/0040065 A1 * | 11/2001 | Takagi et al. | ................ | 180/274 |
| 2003/0015898 A1 * | 1/2003 | Breed | ..................... | 297/216.12 |
| 2004/0212226 A1 | 10/2004 | Bethge et al. | | |
| 2005/0146174 A1 * | 7/2005 | Maddelein et al. | ....... | 297/216.1 |

FOREIGN PATENT DOCUMENTS

| | | |
|---|---|---|
| DE | 19961799 | 7/2001 |
| DE | 10318417 | 1/2005 |
| DE | 60020160 | 10/2006 |
| JP | HEI-5-65659 | 8/1993 |
| WO | 01/45985 | 6/2001 |

* cited by examiner

*Primary Examiner*—Michael Zanelli
(74) *Attorney, Agent, or Firm*—Rankin, Hill, Porter & Clark LLP

(57) ABSTRACT

Protection apparatus includes: a seat back pivotable between reclined and upright positions; a pivoting-angle adjustment section for adjusting the pivoting angle of the seat back through a motor; a prediction section for predicting an object likely to collide against the vehicle from behind; a control section for controlling the adjustment section, in accordance with a prediction signal generated by the prediction section, to cause the seat back to be pivoted to a practically vertical upright position. The control section is arranged to control the adjustment section in accordance with not only the prediction signal but also an operation signal from a manual seat operating section. When the prediction signal has been received, the control section controls the adjustment section to cause the seat back to be pivoted to the practically vertical upright position at higher speed than when the operation signal has been received.

16 Claims, 9 Drawing Sheets

VEHICLE OCCUPANT PROTECTION APPARATUS

FIELD OF THE INVENTION

The present invention relates generally to apparatus for protecting a vehicle occupant (e.g., passenger) seated in a vehicle seat, and more particularly to an improved vehicle occupant protection apparatus for protecting a vehicle occupant when a rear-end crash or collision has occurred to the vehicle, i.e. when an external object has collided against the vehicle from behind.

BACKGROUND OF THE INVENTION

In the field of vehicles, such as automotive vehicles, there have been commonly known a technique for protecting a vehicle occupant by adjusting a pivoting or reclining angle of a seat back (e.g., Japanese Utility Model Laid-Open Publication No. HEI-5-65659).

FIG. 10 hereof schematically shows a conventional vehicle occupant protection apparatus disclosed in the HEI-5-65659 publication, in which section (a) illustrates a general structure of the vehicle occupant protection apparatus, section (b) illustrates the seat back in its reclined position, and section (c) illustrates the seat back in its upright position.

As illustrated in section (a) of FIG. 10, a vehicle seat 100 in the disclosed vehicle occupant protection apparatus 110 comprises a seat cushion or base 101, a seat back 102 and a head rest 103. In the disclosed vehicle occupant protection apparatus 110, a control section 111 controls rotation of four motors 121–124 in accordance with signals received from a seat operation switch 112, vehicle velocity sensor 113 and position sensor 114. The first motor 121 drives a slide mechanism 125 to slide the seat base 101 horizontally in a front-and-rear direction of the vehicle. The second motor 122 drives a front height mechanism 126 to pivot a front portion of the seat base 101 vertically in a top-and-bottom direction of the vehicle. The third motor 123 drives a rear height mechanism 127 to pivot a rear portion of the seat base 101 vertically in the top-and-bottom direction of the vehicle. The fourth motor 124 drives a reclining mechanism 128 to pivot the seat back 102 vertically in the front-and-rear direction of the vehicle.

As illustrated in section (b) of FIG. 10, the control section 111 generates a signal to the fourth motor 124 once the vehicle velocity detected by the velocity sensor 113 exceeds a predetermined velocity value while the pivoting (i.e., reclining) angle $\theta r$ of the seat back 102 is greater than a predetermined reference angle $\theta s$. As a consequence, the seat back 104 can be pivoted compulsorily up to the reference angle $\theta s$. The "reclining angle $\theta r$" means an inclination angle through which the seat back 102 is inclined relative to the vertical line. In the illustrated example, the predetermined reference angle $\theta s$ is 25°.

In ordinary use of the vehicle seat 100, the seat back 102 is often kept inclined rearwardly approximately to the reference angle $\theta s$ (i.e., the reclining angle $\theta r$ is kept approximately equal to the reference angle $\theta s$), as seen in section (c) of FIG. 10, in order to give sitting comfort to the vehicle occupant Mn seated in the seat 100. In the event a rear-end collision has occurred to the vehicle in such use condition of the vehicle seat 100, the upper half of the body of the vehicle occupant Mn would be forced rearwardly due to inertia of the vehicle occupant Mn, namely, due to reactive force of the read-end collision. Because the seat back 102 is kept in the rearwardly-inclined position, there would occur so-called "floating-up" of the occupant's body, i.e. the body of the vehicle occupant Mn is thrown upwardly and rearwardly along the inclined seat back 102 due to an upward component of the inertia.

SUMMARY OF THE INVENTION

In view of the foregoing prior art problems, it is an object of the present invention to provide an improved vehicle occupant protection apparatus which, when an external object has collided against the vehicle from behind, can effectively prevent undesired floating-up, from a seat, of an occupant of the vehicle to thereby keep an appropriate posture, relative to the seat, of the occupant against the collision.

In order to accomplish the above-mentioned object, the present invention provides an improved vehicle occupant protection apparatus, which comprises: a reclinable seat back of a vehicle seat, the seat back being pivotable between a reclined position and an upright position; a pivoting-angle adjustment section for adjusting the pivoting or reclining angle of the seat back through power; a rear-end-collision prediction section for predicting an external object likely to collide against the vehicle from behind; a control section for controlling the pivoting-angle adjustment section, in accordance with a collision prediction signal generated by the rear-end-collision prediction section, so as to cause the seat back to be pivoted to a practically vertical upright position.

Namely, when the rear-end-collision prediction section has predicted potential collision, against the vehicle, of an external object approaching too close to the vehicle from behind (i.e., possible colliding object), the control section controls the pivoting-angle adjustment section, in accordance with the collision prediction signal generated by the rear-end-collision prediction section, so that the seat back is pivoted up to the practically vertical upright position. Then, if the external object (i.e., possible colliding object) has actually collided against the vehicle from behind, the upper half of the body of a vehicle occupant in the seat would be forced or thrown rearwardly due to inertia of the vehicle occupant, namely, reactive force of the collision. However, because the seat back has already been pivoted up to the practically vertical upright position immediately before the collision in the above-stated manner, the upright seat back can effectively prevent the body of the occupant from floating upwardly and rearwardly along the seat back. Because the seat back in the present invention can prevent the floating-up of the occupant's body in this manner, the present invention can keep the occupant in an appropriate posture relative to the seat against the rear-end collision.

In one embodiment of the present invention, the control section is arranged to control the pivoting-angle adjustment section not only in accordance with the collision prediction signal but also in accordance with an operation signal received from a manual seat operating section. When the collision prediction signal has been received, the control section controls the pivoting-angle adjustment section so as to cause the seat back to be pivoted up to the practically vertical upright position at considerably higher speed than when the operation signal has been received.

When the vehicle occupant has operated the manual seat operating section as desired and the resultant operation signal has been received from the manual seat operating section, the control section controls the pivoting-angle adjustment section so as to adjust the pivoting or reclining angle of the seat back. When, on the other hand, the collision prediction signal has been received, the control section controls the pivoting-angle adjustment section so that the speed at which the seat back is pivoted up to the practically vertical upright position in response to the prediction signal is higher than the speed at which the seat back is pivoted to the upright position in response to the operation signal from the manual seat operating section.

Thus, when a rear-end collision has been predicted, the seat back can be pivoted up to the practically vertical upright position very quickly as compared to when the reclining angle of the seat back is to be adjusted through manual operation. Consequently, when a rear-end collision has been predicted, the seat back can be pivoted up to the practically vertical upright position quickly enough to appropriately prepare for the imminent rear-end collision. Therefore, even when there is extremely little time before the rear-end collision, an appropriate stable posture, relative to the seat, of the occupant can be secured very promptly and reliably, and thus the occupant's posture can be adapted to various conditions in a stable manner at the time of occurrence of the rear-end collision.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

It should be noted that the terms "front", "rear", "left", "right", "upper", "lower", etc. used herein represent directions as viewed by a human driver of a vehicle employing a vehicle occupant protection apparatus of the present invention.

Figure 1:
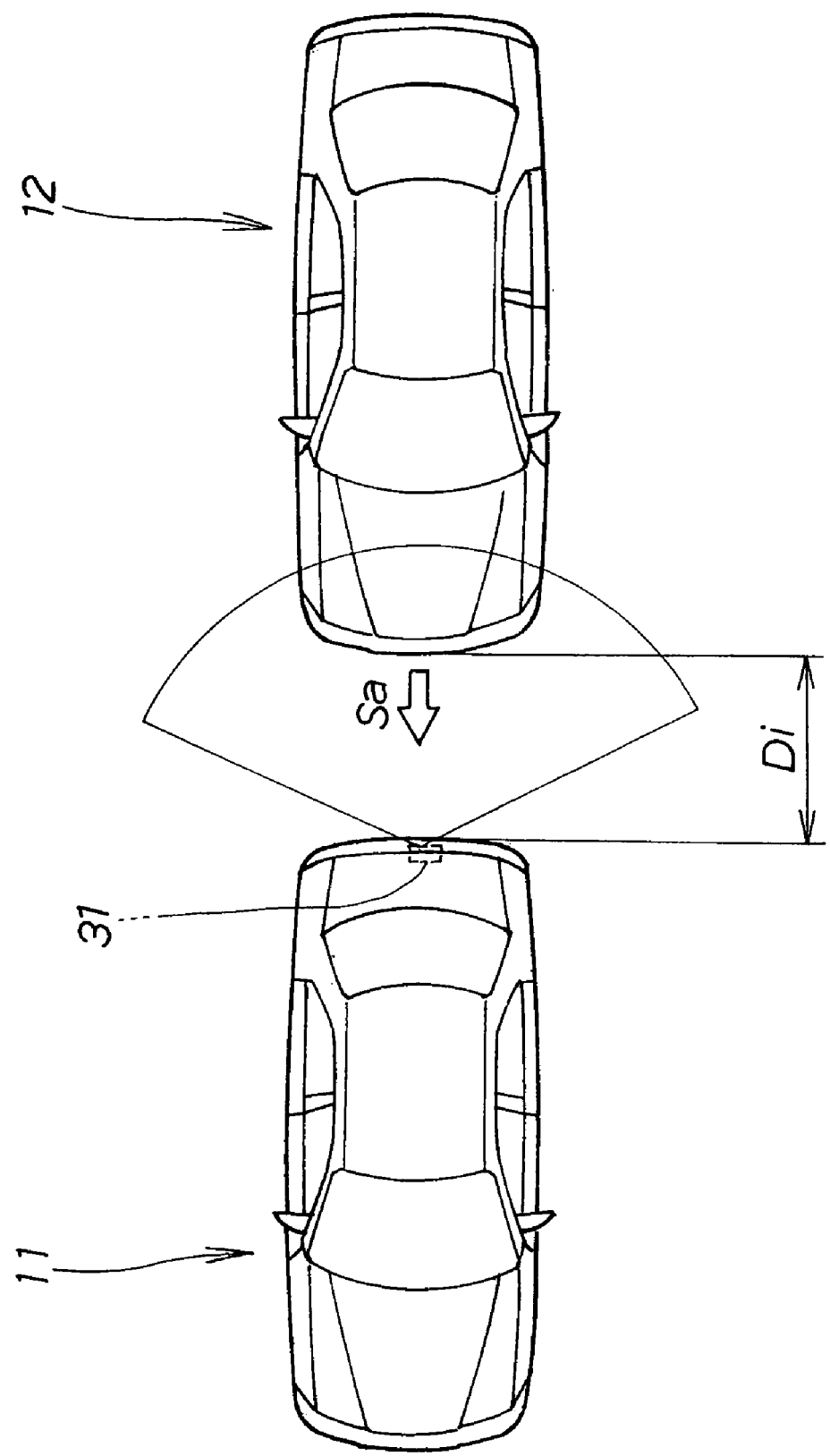
FIG. 1 is a plan view of a vehicle employing a vehicle occupant protection apparatus in accordance with an embodiment of the present invention.

The vehicle 11 in FIG. 1 is an automotive vehicle provided with a rear-end-collision prediction unit 31 in its rear-end middle region. The prediction unit 31 predicts an external object 12 approaching too close to the vehicle 11 from behind and hence likely to collide against the vehicle 11 from behind (i.e., possible colliding object), and generates a collision prediction signal. Here, let it be assumed that the "possible colliding object 12" is another vehicle running behind the vehicle 11 in question ("rear vehicle").

Figure 2:
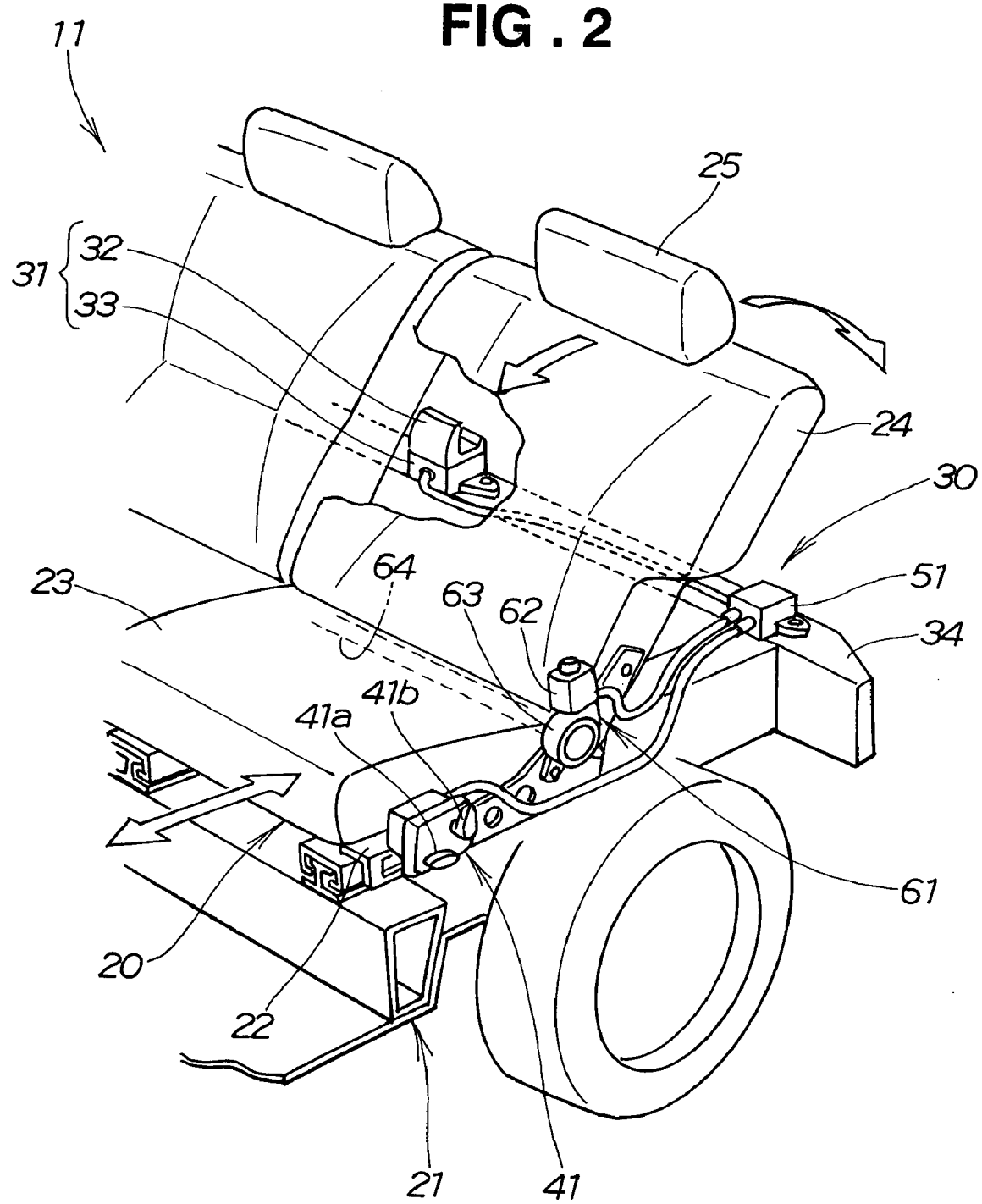
FIG. 2 is a perspective view showing a rear portion of the vehicle employing the vehicle occupant protection apparatus of the present invention.

FIG. 2 is a perspective view showing a rear portion of the vehicle 11 where there are provided a seat 20 and the vehicle occupant protection apparatus 30 of the present invention.

As shown, the seat 20 includes a seat support 22 fixed to the floor of the vehicle 21, a seat cushion or base 23 supported on the seat support 22 for sliding movement therealong in the front-and-rear direction of the vehicle 11, a seat back 24 attached to the seat support 22 for pivotal movement between a reclined position and an upright position, and a head rest 25 fixed to the top of the seat back 24.

The vehicle occupant protection apparatus 30 of the present invention comprises the above-mentioned rear-end-collision prediction unit 31, a manual seat operating section 41 for manually manipulating or operating the seat base 23 and seat back 24, and a control unit 51 for generating control signals in response to operation signals received from the rear-end-collision prediction unit 31 and manual seat operating section 41. The vehicle occupant protection apparatus 30 also includes a seat-base adjustment section (not shown) for adjusting, via power, the seat base 23 in accordance with the control signal received from the control unit 51, and a pivoting-angle adjustment section 61 for adjusting, via power, the pivoting angle or reclining angle of the seat back 24.

The rear-end-collision prediction unit 31 includes a rear-external-object detecting sensor 32, and a collision prediction/determination section 33 for predicting a possible colliding object 12 (see FIG. 1) on the basis of a detection signal from the rear-external-object detecting sensor 32 and thereby generating a collision prediction signal.

The rear-external-object detecting sensor 32 is provided for detecting an external object present immediately behind the vehicle 11, i.e. a possible colliding object 12, and the rear-external-object detecting sensor 32 is in the form of an ultrasonic sensor, infrared sensor, ultraviolet sensor, visible light sensor, laser sensor, radar-type sensor or an imaging device (camera device) like a CCD. At least one such rear-external-object detecting sensor 32 is disposed on an appropriate rear portion, such as a rear bumper beam 34, of the vehicle 11 where the sensor 32 is allowed to reliably detect any possible colliding object 12 located immediately behind, or approaching too close to, the vehicle 11 without being influenced by disturbances.

If a distance Di between the vehicle 11 and the possible colliding object 12 (see FIG. 1) is smaller than a predetermined reference distance value and an approaching speed Sa of the possible colliding object 12 relative to the vehicle 11 (see also FIG. 1) is greater than a predetermined reference speed value, then the collision prediction/determination section 33 determines that there is a high possibility of the object 12 actually colliding against the vehicle 11 from behind, to thereby generate a collision prediction signal. It is preferable that the collision prediction/determination section 33 be further capable of determining whether, in case the object 12 actually collides against the vehicle 11, the vehicle 11 will undergo an impact such that the occupant in the seat 20 is influenced substantially.

The manual seat operating section 41 is in the form of an operation switch section that includes an operation lever 41a for manipulating the seat base 23 and an operation lever 41b for manipulating the seat back 24. The operation switch section 41 is located near a hand of the occupant seated in the seat 20. In response to operation, by the occupant or the like, of the seat base operation lever 41a, the manual seat operating section 41 generates operation signals for controlling the inclination and sliding movement, in the front-and-rear direction, of the seat base 23. Also, in response to operation, by the occupant or the like, of the seat back operation lever 41b, the manual seat operating section 41 generates an operation signal for controlling the inclination or pivoting angle (reclining angle) of the seat back 24.

The pivoting-angle adjustment section 61 includes a seat-back driving electric motor 62 (hereinafter referred simply as "motor 62"), a transmission mechanism 63 for transmitting the power of the motor 62 in reduced level, and a reclining mechanism 64 for pivoting the seat back 24, between the reclined position and the upright position, via the power transmitted from the transmission mechanism 63. The motor 62 is, for example, in the form of a DC motor.

The following paragraphs describe details of the vehicle occupant protection apparatus 30 only in relation to the control of the seat back 24.

Figure 3:
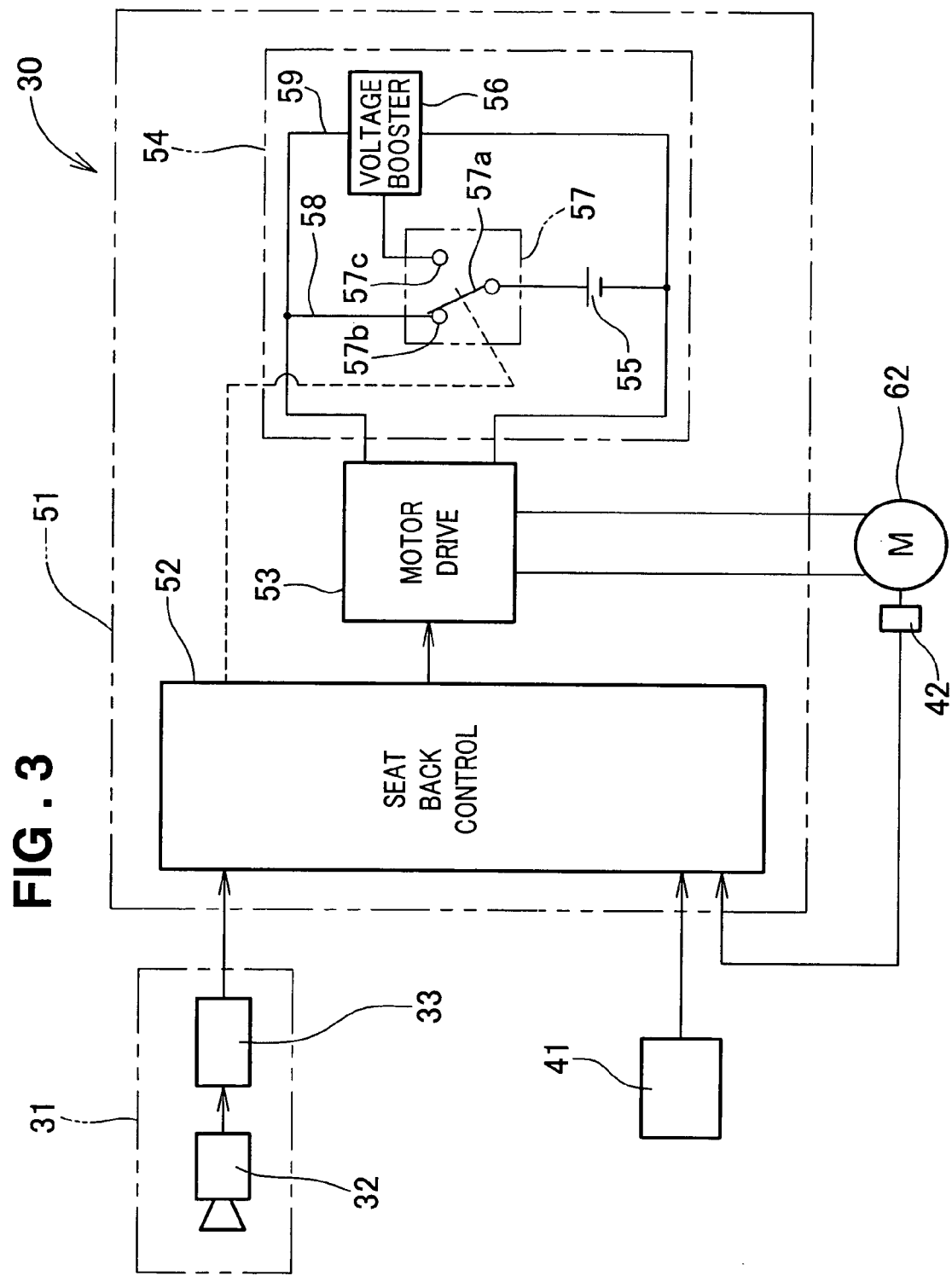
FIG. 3 is a block diagram of the vehicle occupant protection apparatus of the present invention.

FIG. 3 is a block diagram of the vehicle occupant protection apparatus 30 of the present invention.

The control unit 51 of the vehicle occupant protection apparatus 30 includes a seat back control section 52, a motor drive circuit 53 and a power supply circuit 54, and the control unit 51 also receives a seat back position signal from a position sensor 42. The seat back control section 52 controls the motor 62 and power supply circuit 54, via the motor drive circuit 53, in accordance with the collision prediction signal from the rear-end-collision prediction unit 31, operation signals from the manual seat operating section 41 and seat back position signal from the position sensor 42. The seat back control section 52 comprises, for example, a microcomputer and its peripherals.

The position sensor 42 detects an inclined position, i.e. pivoting angle (reclining angle), of the seat back 24 of FIG. 2, and the position sensor 42 is, for example, in the form of a sensor for detecting a phase of a rotor of the motor 62. By thus detecting the rotor phase, it is possible to determine the reclining angle of the seat back 24.

The motor drive circuit 53, which is supplied with the power from the power supply circuit 54, supplies electric power to the motor 62 in accordance with control signals from the seat back control section 52.

The power supply circuit 54 supplies a selected one of two different supply voltages to the motor 62; for this purpose, the power supply circuit 54 includes a battery 55, voltage boosting circuit 56 and voltage switch 57. The voltage boosting circuit 56 raises the output voltage of the battery 56 to generate a voltage higher than the original battery voltage, and it is, for example, in the form of an inverter circuit.

In response to a control signal from the seat back control section 52, the voltage switch 57 selects one of the two supply voltages to be supplied to the motor drive circuit 53; the voltage switch 57 is, for example, in the form of a relay (illustration of the exciting coil of the relay is omitted). The voltage switch 57 behaves as follows.

Normally, a movable contact 57a is caused to contact a first fixed contact 57b in accordance with a control signal generated by the seat back control section 52 in response to the operation signal from the manual seat operating section 41, so that electric power is supplied from the battery 55 to the motor drive circuit 53 via an electric power channel 58. The movable contact 57a is caused to contact a second fixed contact 57c in accordance with a control signal generated by the seat back control section 52 in response to the collision prediction signal from the rear-end-collision prediction section 31, so that a high-voltage electric power is supplied from the battery 55 to the motor drive circuit 53 via another electric power channel 59.

Generally, the DC motor has the characteristic that the number of rotations of the motor increases in substantial proportion to the intensity of a supplied voltage or power. Thus, when a normal voltage is supplied from the battery 55 to the motor 62 which, in the illustrated example, is a DC motor, the motor 62 rotates at normal speed (i.e., with a normal number of rotations). To facilitate understanding of the description, the normal voltage supplied from the battery 55 will be referred to as "low voltage", and the rotation of the motor 62 at the low voltage will be referred to as "low-speed rotation". When a high voltage is supplied from the battery 55 to the motor 62, on the other hand, the motor 62 is rotated at high speed (high-speed rotation). Namely, by the voltage switching control via the selection switch 57, the motor 62 can be set to one of the normal or low-speed rotation and the high-speed rotation based on the collision prediction signal.

In response to the collision prediction signal, the seat back 24 (see FIG. 2) is driven, via the motor 62, to pivot to the upright position very quickly for an extremely short time period. Because of such an extremely short driving time, heat generation by the motor 62 has extremely small influences even when a voltage exceeding a rated voltage is temporarily supplied to the motor 62; therefore, the above arrangements will not cause any substantial inconveniences.

Next, a description will be given about example control to be performed by the seat back control section 52 implemented by a microcomputer, with reference to FIG. 4 and FIGS. 2 and 3 as well.

Figure 4:
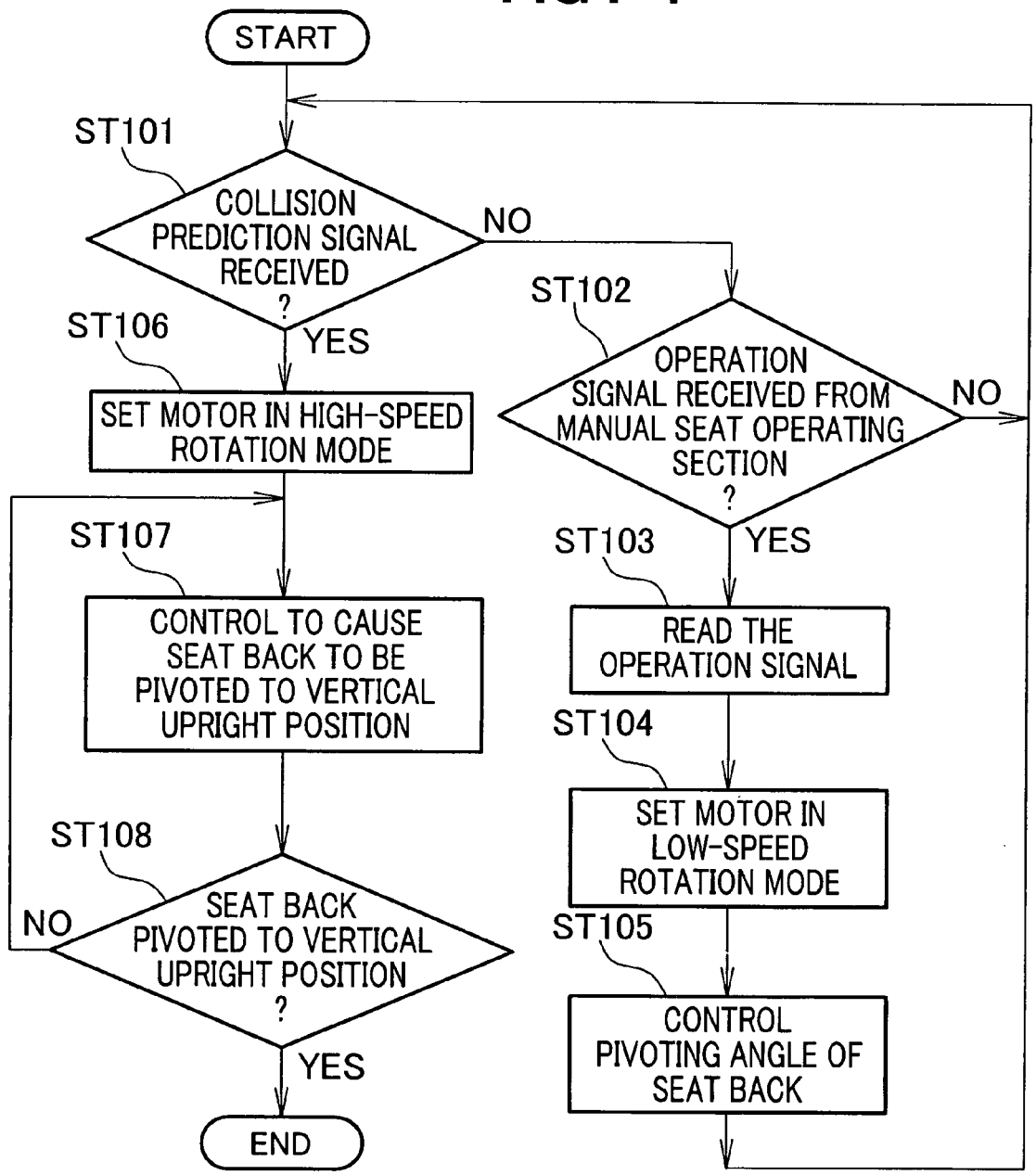
FIG. 4 is a flow chart of control performed by a seat back control section in the vehicle occupant protection apparatus of the present invention.

FIG. 4 is a flow chart of the control performed by the seat back control section 52.

Step ST101: It is determined whether a collision prediction signal has been received from the rear-end-collision prediction unit 31. With a NO determination, the control branches to step ST102, while, with a YES determination, the control proceeds to step ST106.

Step ST102: It is further determined whether an operation signal has been received from the manual seat operating section 41. With a NO determination, the control reverts to step ST101, while, with a YES determination, the control proceeds to step ST103.

Step ST103: The operation signal received from the manual operation section 41 is read.

Step ST104: The voltage switch 57 is switched over to the low-voltage contact, so as to set the motor 62 in the low-speed rotation mode.

Step ST105: The motor 62 is controlled in accordance with the operation signal from the manual seat operating section 41 so as to control the pivoting angle (reclining angle) of the seat back 24, and then the control reverts to step ST101. Namely, in accordance with the operation signal generated in response to manipulation of the seat back lever 41b, the seat back control section 52 generates and output a control signal to the motor 62 via the motor drive circuit 53.

Step ST106: The voltage switch 57 is switched over to the high-voltage contact, so as to set the motor 62 in the high-speed rotation mode.

Step ST107: The motor 62 is controlled so that the seat back 24 assumes a practically vertical (i.e., complete) upright position. With a NO determination, step ST107 is repeated, while, with a YES determination, the control is brought to an end.

Step ST108: It is further determined whether the seat back 24 has been pivoted up to the practically vertical upright position. Via the position sensor 42, it can be ascertained that the seat back 24 is now in the practically vertical upright position.

As apparent from the foregoing description, when the collision prediction signal has been received from the rear-end-collision prediction unit 31, the seat back control section 52 performs, with a higher priority, the control responsive to the prediction signal, to thereby control the motor 62 so that the seat back 24 assumes the practically vertical (i.e., complete) upright position.

Now, behavior of the vehicle occupant protection apparatus 30 constructed in the above-described manner will be explained with reference to FIGS. 5 and 6.

Figure 5:
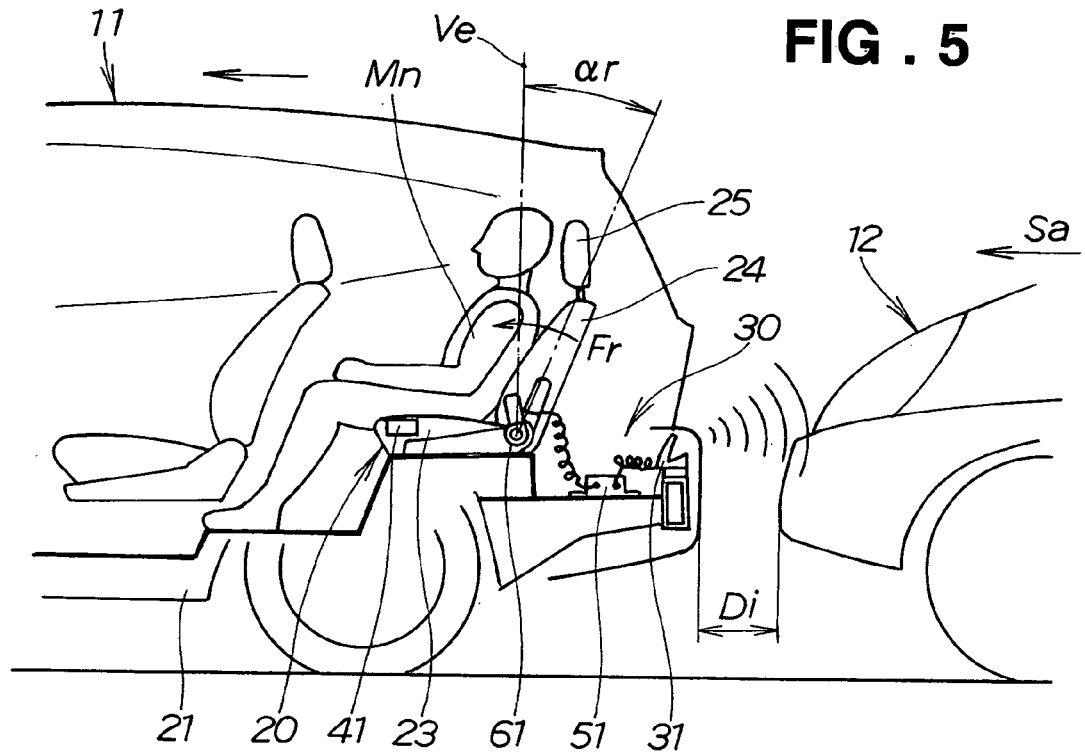
FIG. 5 is a first view explanatory of behavior of the vehicle occupant protection apparatus of the present invention.

FIG. 5 is a first view explanatory of the behavior of the vehicle occupant protection apparatus 30, which particularly shows a possible colliding object (rear vehicle) approaching the vehicle 11 from behind. Here, the seat 20 is being used with the seat back 24 inclined rearwardly through a pivoting or reclining angle αr from the vertical line Ve, in order to provide appropriate sitting comfort to the occupant Mn. When the occupant Mn has operated the manual seat operating section 41 as desired, the operation signal generated by the operating section 41 is given to the control unit 51, so that the control unit 51 controls the pivoting-angle adjustment section 61, in accordance with the operation signal, so as to adjust the reclining angle αr of the seat back 24.

Figure 6:
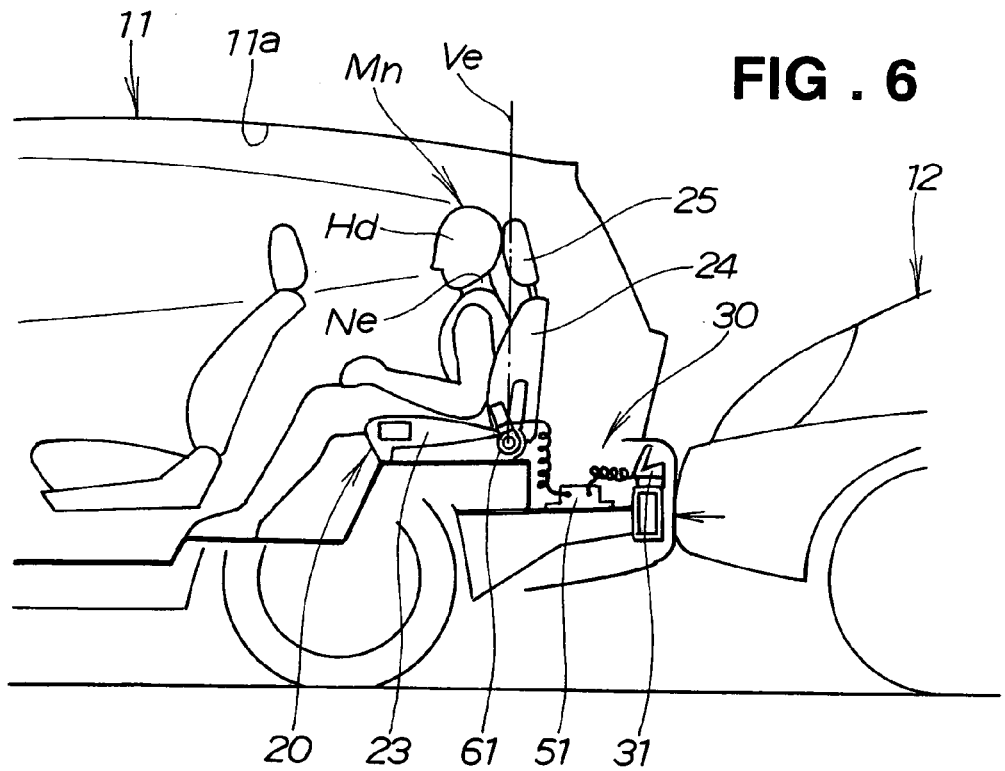
FIG. 6 is a second view explanatory of the behavior of the vehicle occupant protection apparatus of the present invention.

Namely, when, in such use condition, the rear-end-collision prediction unit 31 has predicted that there is a possible colliding object 12 approaching too close to the vehicle 11 from behind, the control unit 51 controls the pivoting-angle adjustment section 61 so as to automatically pivot the seat back 24, in a direction of arrow Fr, up to the practically vertical upright position, as illustrated in FIG. 6.

FIG. 6 is a second view explanatory of the behavior of the vehicle occupant protection apparatus, which particularly shows the seat back 24 having been pivoted up to the practically vertical upright position.

If the possible colliding object 12 has actually collided against the vehicle 11 from behind (i.e., into the rear end of the vehicle 11), the upper half of the body of the vehicle occupant Mn would be forced rearwardly due to inertia of the vehicle occupant Mn, namely, reactive force of the collision. However, because the seat back 24 has already been pivoted up to the practically vertical upright position immediately before the collision, the seat back 24 can effectively prevent undesired "floating-up" of the body of the occupant Mn, i.e. prevent the occupant's body from being thrown upwardly and rearwardly along the seat back 24. Because the protection apparatus of the invention can prevent the floating-up of the occupant's body in this manner, it can keep the occupant in an appropriate posture relative to the seat 20 against the rear-end collision. In addition, the protection apparatus of the present invention can enhance the protection functions of a seat belt and air-bag provided for the occupant Mn seated in the seat 20. Note that reference numeral 11a in FIG. 6 represents the ceiling of the vehicle compartment, Hd the head of the occupant Mn and Ne the neck of the occupant Mn.

Note that, when the collision prediction signal has been received from the rear-end-collision prediction unit 31, the control unit 51 controls the pivoting-angle adjustment section 61 so that the speed at which the seat back 24 is pivoted up to the practically vertical upright position in response to the prediction signal is higher than the speed at which the seat back 24 is pivoted to the upright position in response to the operation signal from the manual seat operating section 41.

Thus, when a rear-end collision has been predicted, the seat back 24 can be pivoted up to the practically vertical upright position very quickly as compared to when the reclining angle αr of the seat back 24 is to be adjusted through manual operation. Consequently, when a rear-end collision has been predicted, the seat back 24 can be pivoted up to the practically vertical upright position quickly enough to appropriately prepare for the imminent rear-end collision. Therefore, even when there is extremely little time before the rear-end collision, an appropriate stable posture, relative to the seat 20, of the occupant Mn can be secured very quickly and reliably, so that the occupant's posture can be adapted to various conditions in a stable manner at the time of occurrence of the rear-end collision.

Figure 7:
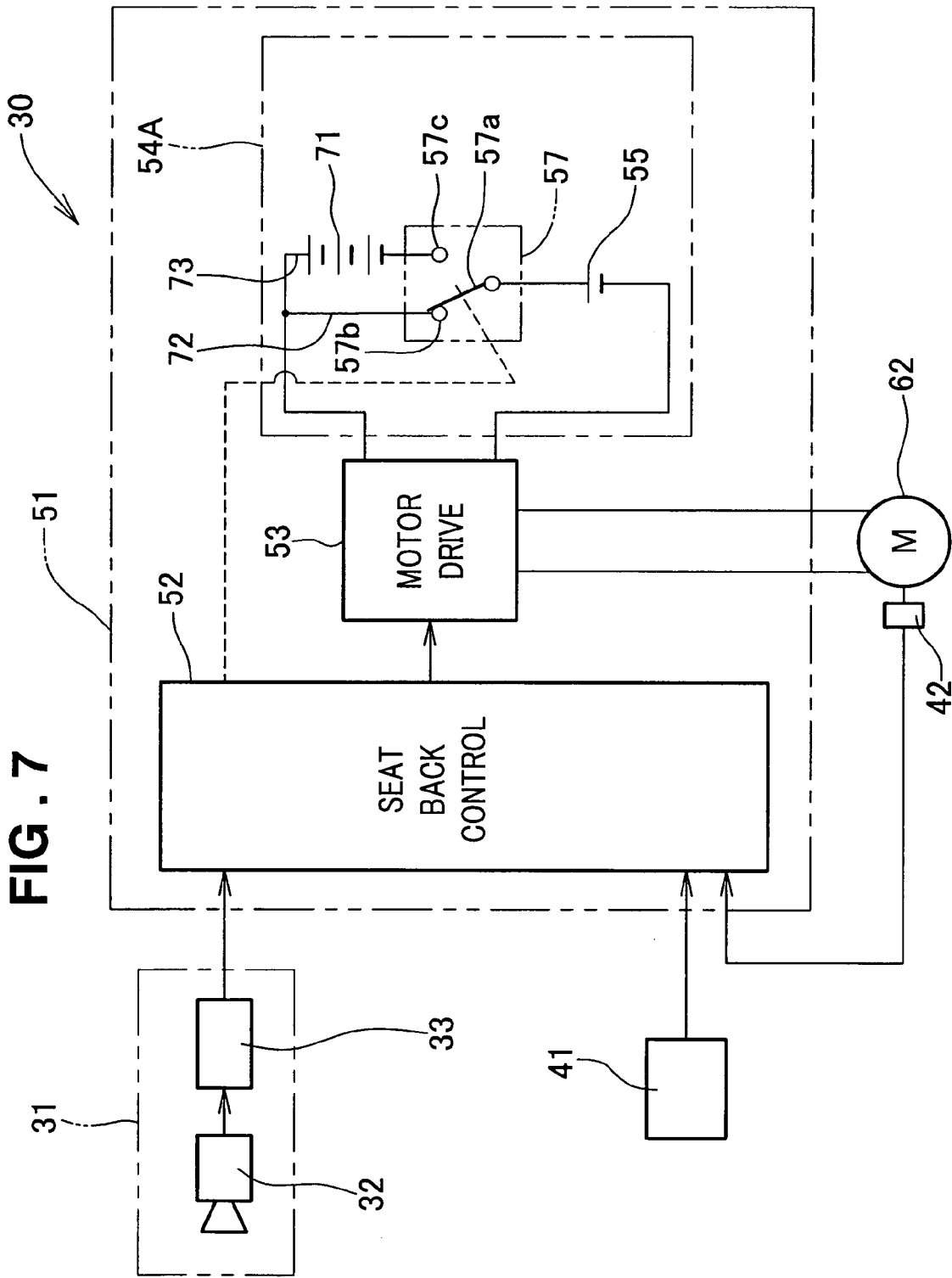
FIG. 7 is a block diagram showing the vehicle occupant protection apparatus employing a first modification of a control unit.
Figure 8:
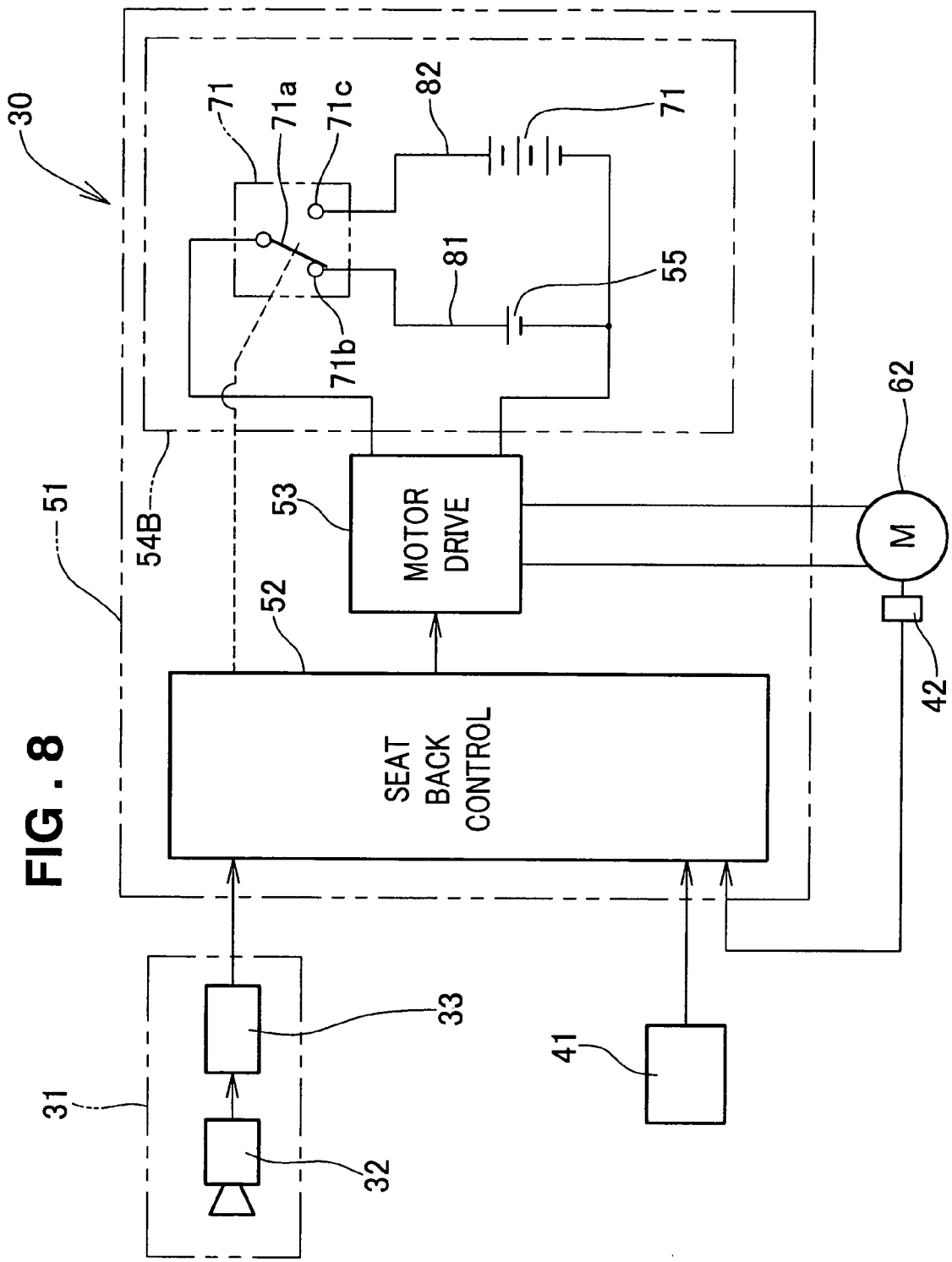
FIG. 8 is a block diagram showing the vehicle occupant protection apparatus employing a second modification of the control unit.
Figure 9:
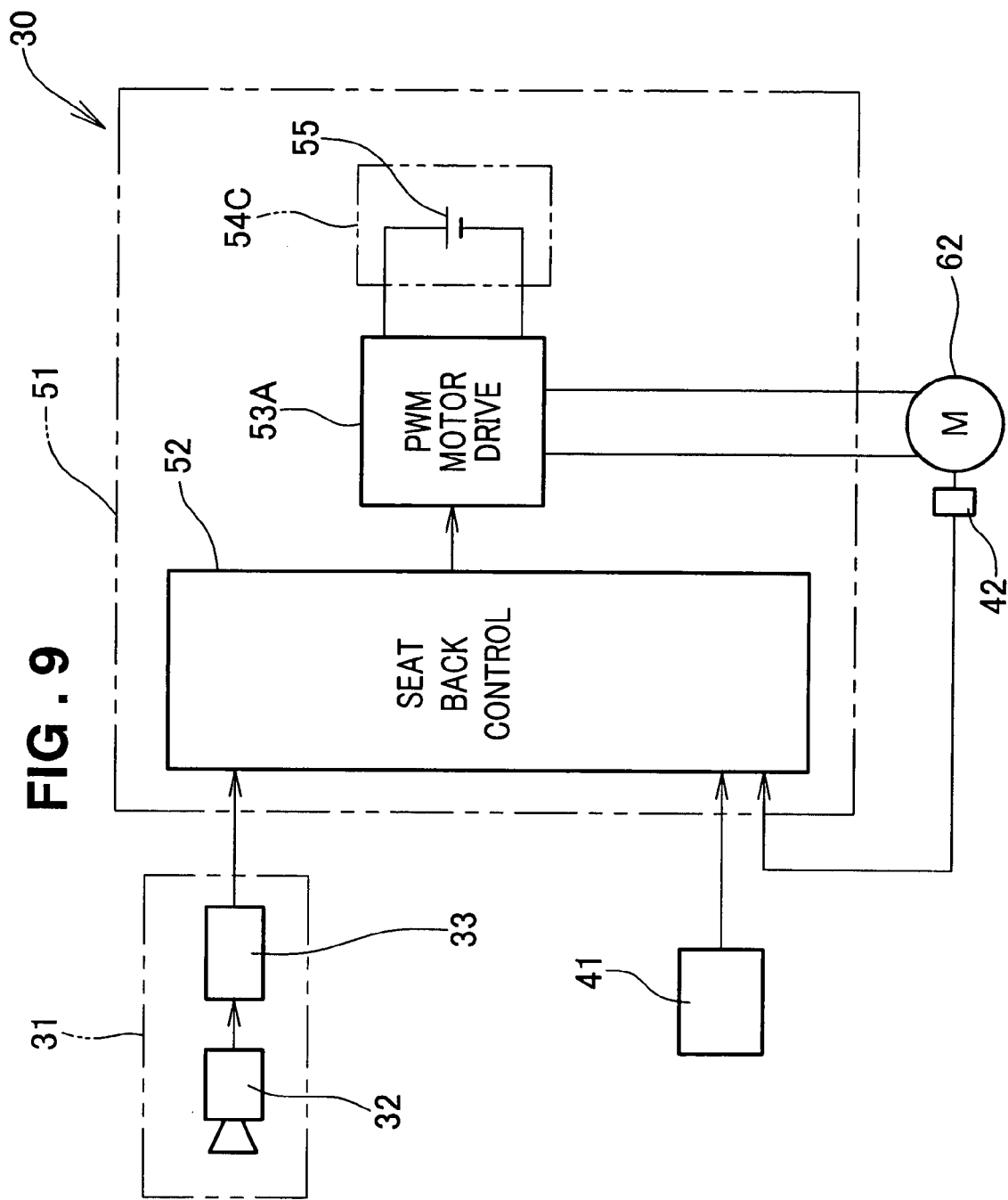
FIG. 9 is a block diagram showing the vehicle occupant protection apparatus employing a third modification of the control unit.
Figure 10:
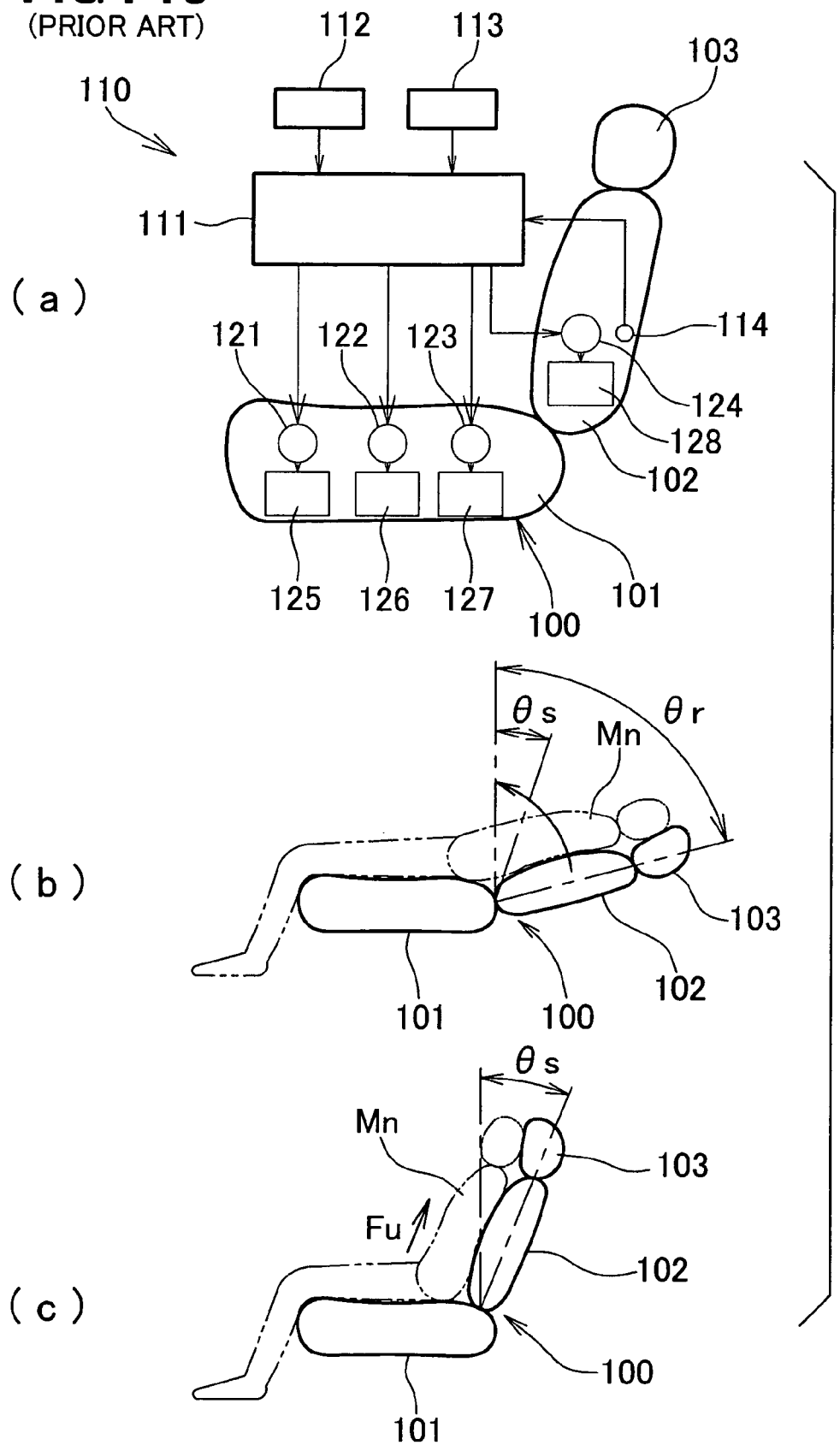
FIG. 10 is a view schematically showing a conventional vehicle occupant protection apparatus.

The following paragraphs describe modifications of the control unit 51 with reference to FIGS. 7–9, where the same elements as in the embodiment of FIG. 3 are indicated by the same reference numerals and will not be described to avoid unnecessary duplication.

FIG. 7 is a block diagram similar to FIG. 3, which shows the vehicle occupant protection apparatus 30 employing a first modification of the control unit 51. The first modification of the control unit 51 is characterized by including a power supply circuit 54A in place of the power supply circuit 54 of FIG. 3. In the first modification, the power supply circuit 54A includes an auxiliary power source 71, in addition to the battery 55 as the main power source. The auxiliary power source 71 is provided in place of the voltage boosting circuit 56 of FIG. 3, and it is in the form of a battery of a higher voltage than the main power source 55.

The voltage switch 57 can switch between (1) a power channel 72 for supplying a low-voltage power to the motor drive circuit 53 only from the main power source 55 and (2) a power channel 73 for supplying a high-voltage power to the motor drive circuit 53 from the main power source 55 and auxiliary power source 71 connected in series with each other.

FIG. 8 is a block diagram similar to FIG. 7, which shows the vehicle occupant protection apparatus 30 employing a second modification of the control unit 51. The second modification of the control unit 51 is characterized by including a power supply circuit 54B in place of the power supply circuit 54A of FIG. 7; namely, the power supply circuit 54B is arranged to switch, via the voltage switch 57, between the main and auxiliary power sources 55 and 71 connected in parallel with each other. Namely, the voltage switch 57 can switch between (1) a power channel 81 for supplying the low-voltage power to the motor drive circuit 53 from the main power source 55 and (2) a power channel 82 for supplying the high-voltage power to the motor drive circuit 53 from the auxiliary power source 71. The auxiliary power source 71 may be a capacitor.

FIG. 9 is a block diagram similar to FIG. 3, which shows the vehicle occupant protection apparatus 30 employing a third modification of the control unit 51. The third modification of the control unit 51 is characterized by including a motor drive circuit 53A in place of the motor drive circuit 54 of FIG. 3 and including a power supply circuit 54C in place of the power supply circuit 54 of FIG. 3. Namely, in the third modification, the power supply circuit 54C includes only the battery 55 so as to supply electric power to the motor drive circuit 53A from the battery 55.

More specifically, in the third modification, the motor drive circuit 53A drives the motor 62 using the pulse width modulation scheme to supply pulse voltages to the motor 62. Thus, the motor drive circuit 53A generates pulse-width-controlled pulse signals in accordance with control signals from the seat back control section 52 and supplies the thus-generated pulse-width-controlled pulse signals to the motor 62 to thereby control the rotation of the motor 62.

Still more specifically, the motor drive circuit 53A either causes the motor 62 to rotate at low speed by generating pulse voltages of a small duty ratio in accordance with the operation signal from the manual seat operating section 41, or causes the motor 62 to rotate at high speed by generating pulse voltages of a greater duty ratio (e.g., 100% duty ratio) in accordance with the collision prediction signal from the rear-end-collision prediction section 31.

It should be appreciated that the seat 20 to which the vehicle occupant protection apparatus 30 is applied may be any other vehicle seat than the one in a rearmost seat row.

As apparent from the foregoing, the vehicle occupant protection apparatus 30 of the present invention can be suitably applied to automotive vehicles, trains and other types of vehicles provided with seats having reclinable seat backs.

Obviously, various minor changes and modifications of the present invention are possible in the light of the above teaching. It is therefore to be understood that within the scope of the appended claims the invention may be practiced otherwise than as specifically described.

What is claimed is:

1. An occupant protection apparatus for a vehicle comprising:
    a reclinable seat back of a vehicle seat, said seat back being pivotable between a reclined position and an upright position;
    pivoting-angle adjustment means for adjusting a pivoting angle of said seat back through power;
    prediction means for predicting an external object likely to collide against the vehicle from behind; and
    control means for controlling said pivoting-angle adjustment means via a selection switch, in accordance with a prediction signal generated by said prediction means, so as to cause said seat back to be pivoted to a practically vertical upright position, wherein said control means is adapted to cause the selection switch to select a low speed circuit to supply a first voltage to said pivoting-angle adjustment means in response to an operation signal received from manual seat operating means so as to pivotally drive said seat back at a first speed, and wherein, when the prediction signal is received, said control means is adapted to cause the selection switch to select a high speed circuit to supply a second voltage to said pivoting-angle adjustment means so as to pivotally drive said seat back at a second speed, said second voltage being greater than said first voltage and said second speed being greater than said first speed.

2. The occupant protection apparatus as claimed in claim 1, wherein said control means includes a voltage boosting circuit to provide the second voltage.

3. The occupant protection apparatus as claimed in claim 1, wherein said control means includes a first battery to provide the first voltage and a second battery to provide the second voltage.

4. The occupant protection apparatus as claimed in claim 1, wherein said controller means includes a battery to provide the first voltage and a capacitor to provide the second voltage.

5. The occupant protection apparatus as claimed in claim 1, wherein said second voltage is greater than any other voltage that is provided by said control means to said pivoting-angle adjustment means.

6. The occupant protection apparatus as claimed in claim 1, wherein said second speed is greater than any other speed for pivotally driving said seat back.

7. An occupant protection apparatus for a vehicle comprising:
    a reclinable seat back of a vehicle seat, said seat back being pivotable between a reclined position and an upright position;
    pivoting-angle adjustment section that is operable to adjust a pivoting angle of said seat back through power;
    a collision prediction section that is operable to predict that an external object is likely to collide against the vehicle from behind; and
    a controller that is operable to control said pivoting-angle adjustment section via a selection switch, in accordance with a prediction signal generated by said collision prediction section, so as to cause said seat back to be pivoted to a practically vertical upright position, wherein said controller is adapted to cause the selection switch to select a low speed circuit to supply a first voltage to said pivoting-angle adjustment section in response to an operation signal received from manual seat operating section so as to pivotally drive said seat back at a first speed, and wherein, when the prediction signal is received, said controller is adapted to cause the selection switch to select a high speed circuit to supply a second voltage to said pivoting-angle adjustment section so as to pivotally drive said seat back at a second speed, said second voltage being greater than said first voltage and said second speed being greater than said first speed.

8. The occupant protection apparatus as claimed in claim 7, wherein said controller includes a voltage boosting circuit to provide the second voltage.

9. The occupant protection apparatus as claimed in claim 7, wherein said controller includes a first battery to provide the first voltage and a second battery to provide the second voltage.

10. The occupant protection apparatus as claimed in claim 7, wherein said controller includes a battery to provide the first voltage and a capacitor to provide the second voltage.

11. The occupant protection apparatus as claimed in claim 7, wherein said second voltage is greater than any other voltage that is provided by said controller to said pivoting-angle adjustment section.

12. The occupant protection apparatus as claimed in claim 7, wherein said second speed is greater than any other speed for pivotally driving said seat back.

13. An occupant protection apparatus for a vehicle comprising:
    a reclinable seat back of a vehicle seat, said seat back being pivotable between a reclined position and an upright position;
    pivoting-angle adjustment section that is operable to adjust a pivoting angle of said seat back through power;
    a collision prediction section that is operable to predict that an external object is likely to collide against the vehicle from behind and to generate a collision prediction signal; and
    a power supply circuit comprising:
        a power supply that provides a first voltage to a selection switch, wherein said selection switch, in response to a manual operation signal, activates a low speed side circuit to supply the first voltage to the pivoting-angle adjustment section and thereby pivotally drive said seat back at a first speed, and wherein said selection switch, in response to the collision prediction signal, activates a high speed side circuit to supply a second voltage to the pivoting angle adjustment section and thereby pivotally drive said seat back at a second speed, said second speed being greater than said first speed.

14. The occupant protection apparatus according to claim 13, wherein said high speed side circuit includes a voltage booster that changes the first voltage, which is provided from the selection switch, into a second voltage, which is then supplied to the pivoting-angle adjustment section.

15. The occupant protection apparatus as claimed in claim 14, wherein said second voltage is greater than any other voltage that is provided by said power supply circuit to said pivoting-angle adjustment section.

16. The occupant protection apparatus as claimed in claim 14, wherein said second speed is greater than any other speed for pivotally driving said seat back.

* * * * *